United States Patent
Jolly

(10) Patent No.: US 11,546,248 B2
(45) Date of Patent: Jan. 3, 2023

(54) SYSTEM AND METHOD FOR SIMULTANEOUS LAYER 3 RESILIENCY DURING AUDIO CAPTURING

(71) Applicant: Red Box Recorders Limited, Nottinghamshire (GB)

(72) Inventor: Simon Jolly, Nottingham (GB)

(73) Assignee: RED BOX RECORDERS LIMITED, Nottinghamshire (GB)

(*) Notice: Subject to any disclaimer, the term of this patent is extended or adjusted under 35 U.S.C. 154(b) by 437 days.

(21) Appl. No.: 16/593,390

(22) Filed: Oct. 4, 2019

(65) Prior Publication Data
US 2021/0105205 A1   Apr. 8, 2021

(51) Int. Cl.
| H04L 12/761 | (2013.01) |
| H04L 45/16 | (2022.01) |
| H04M 3/42 | (2006.01) |
| H04L 45/00 | (2022.01) |
| G10L 17/00 | (2013.01) |

(52) U.S. Cl.
CPC ............. H04L 45/16 (2013.01); G10L 17/00 (2013.01); H04L 45/22 (2013.01); H04M 3/42221 (2013.01)

(58) Field of Classification Search
CPC ......... H04L 45/16; H04L 45/22; H04L 47/12; G10L 17/00; H04M 3/42221
See application file for complete search history.

(56) References Cited

U.S. PATENT DOCUMENTS

| 7,006,614 B2 | 2/2006 | Feinberg et al. |
| 2013/0242718 A1* | 9/2013 | Zhang ................. H04L 12/4633 370/216 |
| 2016/0119179 A1* | 4/2016 | Palmer ............... H04L 41/0654 370/220 |
| 2016/0227029 A1* | 8/2016 | Wolfeld ............. H04L 65/1083 |
| 2018/0337802 A1 | 11/2018 | Parameswaran et al. |
| 2018/0342251 A1* | 11/2018 | Cohen .................. G06F 16/784 |

* cited by examiner

Primary Examiner — Walli Z Butt
(74) Attorney, Agent, or Firm — Katten Muchin Rosenman LLP

(57) ABSTRACT

The disclosed invention provide system and method to ensure resiliency in a network where audio capturing service experiences a failure on one or more active nodes. The network failover system is coupled to a Layer 3 (L3) network and communicates with a network switch through which network packets are transmitted. The failover system performs operations that include receiving network packets that are mirrored via the network switch, monitoring a primary node that captures audio data in the network packets, sending the network packets to a fallback node during an outage of the primary node, examining the network packets to determine which packets are audio-related packets, collecting audio-related packets, and storing the collected audio-related packets in a data storage. The fallback node is in the Layer 3 (L3) network.

17 Claims, 7 Drawing Sheets

SYSTEM AND METHOD FOR SIMULTANEOUS LAYER 3 RESILIENCY DURING AUDIO CAPTURING

BACKGROUND

When a service outage is experienced while the service is provided, there are disadvantages in terms of hampered customer satisfaction and an impacted bottom line. For that reason, when a call recording service that relies on computers and other devices experiences a service-affecting outage, that loss of service can mean millions of dollars in lost revenue to the service provider and pose significant impacts to productivity for the enterprises relying on such services. A failover service must be considered and reliably compensate for the conditions affecting the original outage. The failover service must provide a solution where there is an abundance of scalable network hardware and resources capable of handling the traffic.

Typically, in the case of failures from one node/server to another, the currently active recordings on the failed server are interrupted. Traditionally most resilient failover systems utilize hardware and software redundancy. Moreover, traditional resilient systems emphasize routing traffic to backup systems that are often not the same data network.

SUMMARY

The disclosed invention proposes a circumvention to overcome the data-stream interruption resulting from node failure by rescuing the network packets resulting from the original recording service. They can be analyzed and then resurrected to restore the recording service replete with metadata.

These and other advantages may be provided by, for example, a method for providing resiliency in a network for audio capturing. The method includes capturing audio data in network packets via a primary node, monitoring the primary node, sending the network packet to a fallback node, examining the network packets to determine which packets are audio-related packets, collecting audio-related packets, and storing the collected audio-related packets in a data storage. The fallback node is in a Layer 3 (L3) network. The method may include capturing the audio data in the network packets via a secondary node during the outage of the primary node. The method may include monitoring the secondary node, and sending the network packets to the fallback node during an outage of the secondary node. The method may include mirroring the network packets via a network switch, determining formats of the audio-related packets, sending the network packets to a fallback node while the primary node is active, and/or storing the captured audio data via the primary node in the data storage. The audio data may include metadata that include speaker identifications and audio transcription.

These and other advantages may also be provided by, for example, a network failover system to provide resiliency in a network for audio capturing. The network failover system is coupled to a Layer 3 (L3) network and communicates with a network switch through which network packets are transmitted. The network failover system includes at least one non-transitory storage medium to store executable instructions, and at least one processor to execute the executable instructions that cause the at least one processor to perform operations to provide the resiliency in the network for audio capturing. The operations include receiving network packets from the network switch, monitoring a primary node that captures audio data in the network packets, sending the network packets to a fallback node, examining the network packets to determine which packets are audio-related packets, collecting audio-related packets, and storing the collected audio-related packets in a data storage. The network packets are mirrored via the network switch. The fallback node is in the Layer 3 (L3) network.

These and other advantages may also be provided by, for example, a network resilient system to provide resiliency in a network for audio capturing. The network resilient system coupled to a Layer 3 (L3) network, and includes a network switch having port mirroring capability, at least one non-transitory storage medium to store executable instructions, and at least one processor to execute the executable instructions that cause the at least one processor to perform operations to provide the resiliency in the network for audio capturing. The network switch is coupled to the network for audio capturing. The operations include receiving network packets from the network switch, monitoring a primary node that captures audio data in the network packets, sending the network packet to a fallback node, examining the network packets to determine which packets are audio-related packets, collecting audio-related packets, and storing the collected audio-related packets in a data storage. The network packets are mirrored via the network switch. The fallback node is in the Layer 3 (L3) network.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTIONS

Figure 1A:
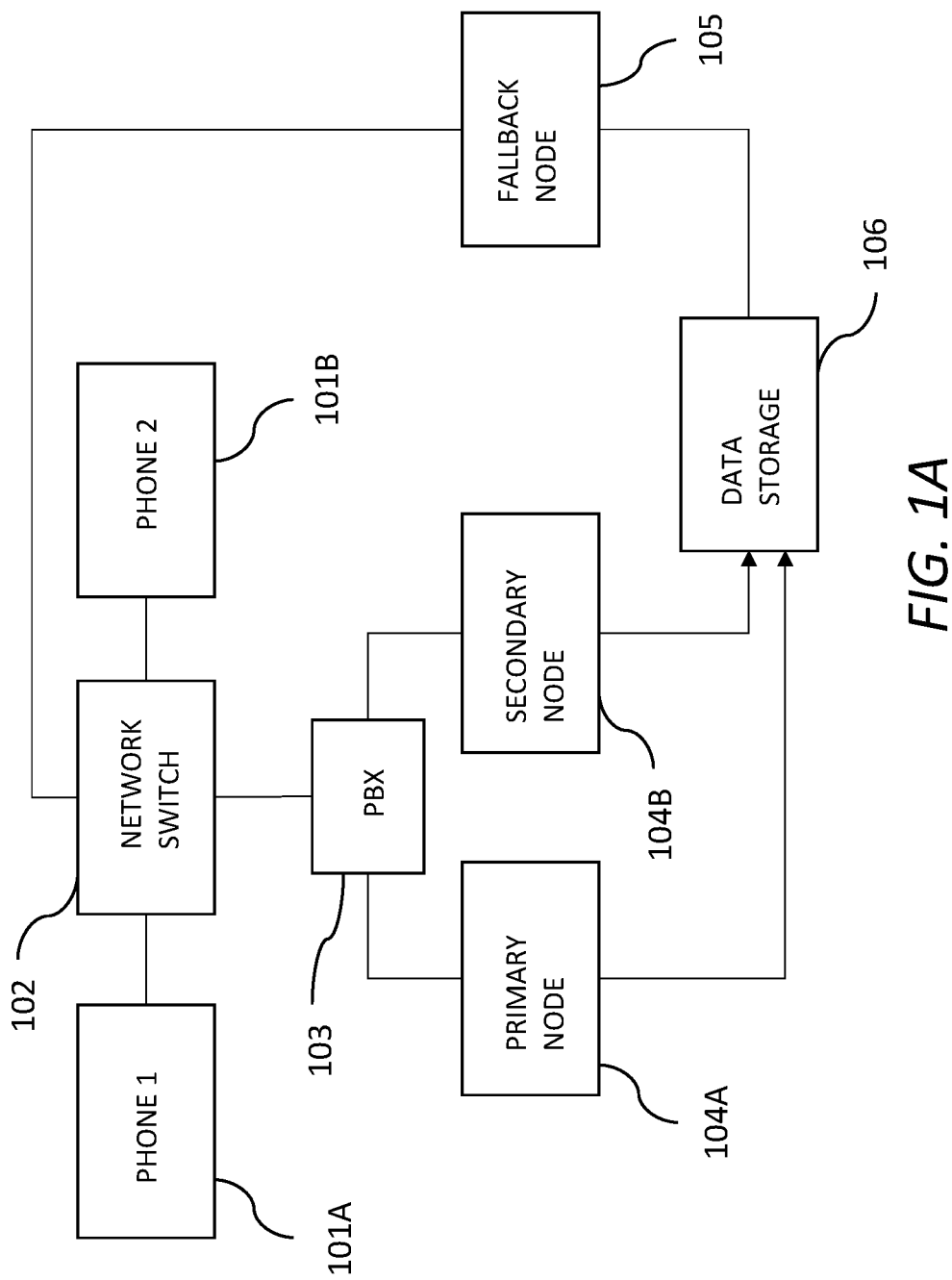
FIG. 1A shows exemplary configurations of network service at a normal operation with primary and secondary nodes.

It is to be understood that the figures and descriptions of the present invention may have been simplified to illustrate elements that are relevant for a clear understanding of the present invention. It is also to be understood that the drawings included herewith only provide diagrammatic representations of the presently preferred structures of the present invention and that structures falling within the scope of the present invention may include structures different than those shown in the drawings. It is also to be understood that the invention is not limited in its applications to the details of the particular arrangements shown since the invention is capable of other embodiments. Also, the terminology used herein is for the purpose of description and not of limitation. In the Summary above and in the Detailed Descriptions and in the accompanying drawings, reference is made to particular features of the invention. It is to be understood that the disclosure of the invention in this specification does not include all possible combinations of such particular features.

For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

The disclosed invention proposes a system and method for resiliency failover through routing and forwarding functions of the Layer 3 (L3) network. L3 is one of layers of Open Systems Interconnection (OSI). L3 provides switching and routing functions, creating logical paths known as virtual circuits, for transmitting data from node to node. Routing and forwarding are functions of L3 layer, as well as addressing, internetworking, error handling, congestion control and packet sequencing. L3 may be referred to as a network layer of OSI. Since routing and forwarding are functions of L3, the use of L3 network, when a critical service such as call recording experiences a major outage, is particularly useful over other resiliency techniques used in the industry. The L3 network, which utilizes switching and routing technologies, has unique characteristics because the compromise in the use of a less rich voice capture is ideal when faced with the failure of a primary voice capturing system. Segments of the existing data network may not be optimal for recording services in the event of a failure condition.

Additionally, wherever the L3 network domain applies, critical services can be resilient because the emphasis is on devices backing up each other. This means that outside traditional business enterprise network infrastructure, L3 resiliency can be used to restore critical services, thereby expanding the zone where voice capturing services are established (enterprise-wide or virtual zones for telecommuters). The advent of Internet of things (JOT) opens networking opportunities that would not otherwise be available such as mobile phones (LTE data) running recording software, or other networked devices capable of taking over a recording in progress such as Alexa (Internet cloud network). The ability to maintain the data stream may be possible because the system core redirects the data stream accordingly to other networked devices.

The disclosed invention provide system and method to ensure resiliency in a network where call recording (i.e. voice capturing or audio capturing) service experiences a failure on active nodes. The distinction with the proposed system and method may be when an active recording session is in service and failure condition of the active recording is met. In this situation, the system core, the network failover system of the disclosed invention, chooses L3 network for data stream to maintain the service. When a default method of call recording service is active and a recording system failure event occurs on one or more active nodes, the system and method proposed are to preserve the data streaming source via L3 network that is the network layer of OSI.

The disclosed invention proposes a system architecture with a logical core that decides if the L3 network provides the most credible and reliable means to preserve the call-recording data. Algorithms are employed to use network parameters such as heartbeat, status signal, fault reporting, etc. to verify that the L3 is the most viable alternative to maintain the active data source (i.e. voice data) capture. Furthermore, while the network layer can be used to keep an active recording session resilient, standard data recovery tools can be used to reconstruct the call metadata and critical aspects of the original capture such as speaker separation.

The resilient data network is typically enhanced with port mirroring enabled. Monitoring the network in this way ensures the switch/server sends a copy of all network packets on one port or an entire virtual local area network (VLAN) to another port, where the packet is retained, and then packets are analyzed. In the system of the disclosed invention, even though the connection to the server or switch is dead, capturing the raw voice call maintains the datastream. For example, even when the primary node and secondary node fail, the packets can be analyzed to determine the recording application format by capturing the packets from the switch or server. In these processes, the packets are essentially rescued by diverting or sending to an alternative storage mechanism that may include the L3 network. The primary or secondary node may produce recorded files with metadata, which include information such as speaker identification (ID), transcribed audio, etc. Through post processing of the saved packet data, the metadata can be reconstructed virtually eliminating the effects of the original node outage by recreating recorded file output as if it is produced via the original nodes.

With reference to FIG. 1A, shown is an exemplary configuration 100A for network services such as a conference call during a normal operation without service outage or failure, in which the primary node 104A and the secondary node 104B are both active being capable of providing the service such as call recording service. Phones 101A and 101B are connected to the network switch 102, and data traffic, such as voice data or streams, between the phones 101A and 101B are processed through the primary node 104A and/or secondary node 104B that are connected to the network switch 102 through a private branch exchange (PBX) 103. FIG. 1A shows two phones as an example but the number of phones participating the network service is not limited. The phones may be corded phones or wireless phones.

The primary node 104A may provide typical recording service in the enterprise network or may run as a service in the cloud. The secondary node 104B may provide a redundant recording service, or may be a traffic bypass solution in the enterprise network. The secondary node 104B may run as a service in the cloud. The network switch 102 may be connected to more additional nodes that may provide redundant recording services or other services. Audio recording provided by the primary and secondary nodes may be transferred to the data storage 106 to store the audio recording data. The stored recording data may be used later for further analysis of the data. The audio recording data from the primary and secondary nodes may include metadata and may be transferred to the data storage 106 in real-time.

The network switch 102 may have port mirroring capability. When the network switch has the port mirroring capability, the network switch 102 is configured to mirror all network packet traffic between the phones 101A and 101B. The mirrored network packets are sent to the fallback node 105. The port mirroring allows the fallback node 105 to receive the network packets, and the network traffic through the network switch 102 to be monitored. The network switch sends the fallback node 105 a copy of every network packet sent to or received from the phones. The network failover system, which is coupled to a Layer 3 (L3) network and communicating with a network switch, may detect voice-related packets inside the network traffic, decodes the voice-related packets, and may save audios on a disk.

The network failover system of the disclosed invention directs the mirrored network packets to a fallback node 105 for audio recording when the primary and secondary nodes experience outages. The fallback node 105 provides a network packet capturing capability, which is a much more simplistic retention mechanism and is less likely to fail in comparison to the primary and secondary nodes. The network failover system of the disclosed invention utilizes the L3 network for the fallback node 105. The fallback node 105 is present in the L3 network utilizing the functionalities of the L3 network, which include routing and forwarding, addressing, internetworking, error handling, congestion control, and packet sequencing. Data collected by the network failover system through the fallback node may be transferred to a data storage unit 106 for storage and further analysis. The data storage unit 106 may be a standard system to intake and store network packets.

As shown in FIG. 1A, even when the primary and secondary nodes are active, the network packets transmitted through the network switch may be mirrored, and the network packets are continuously sent to the fallback node. In other words, the network packets may be always captured and sent to the fallback node. In this case the primary node 104A, the secondary node 104B, and the fallback node 105 concurrently capture the network pack. Optionally, the network packets may be diverted to the fallback node when a failure condition of the primary node and/or the secondary node is detected.

Figure 1B:
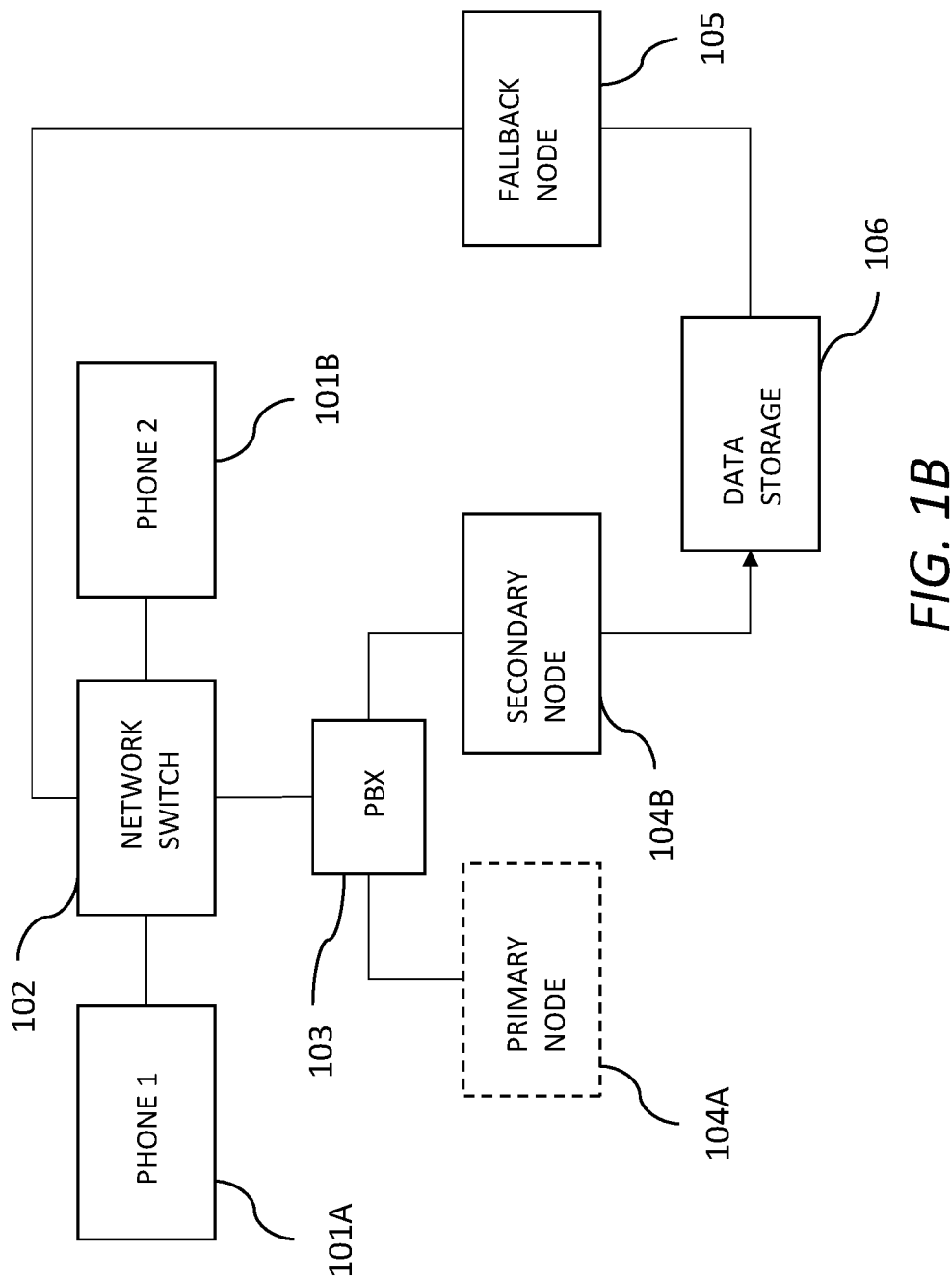
FIG. 1B shows exemplary configurations of network service during outage of a primary node.

With reference to FIG. 1B, shown is an exemplary configuration 100B during outage of the primary node 104A. In this situation the audio recording service may be processed through the secondary node 104B that may provide a redundant recording service. In this situation, the network packets may be mirrored and sent to the fallback node 105.

Figure 1C:
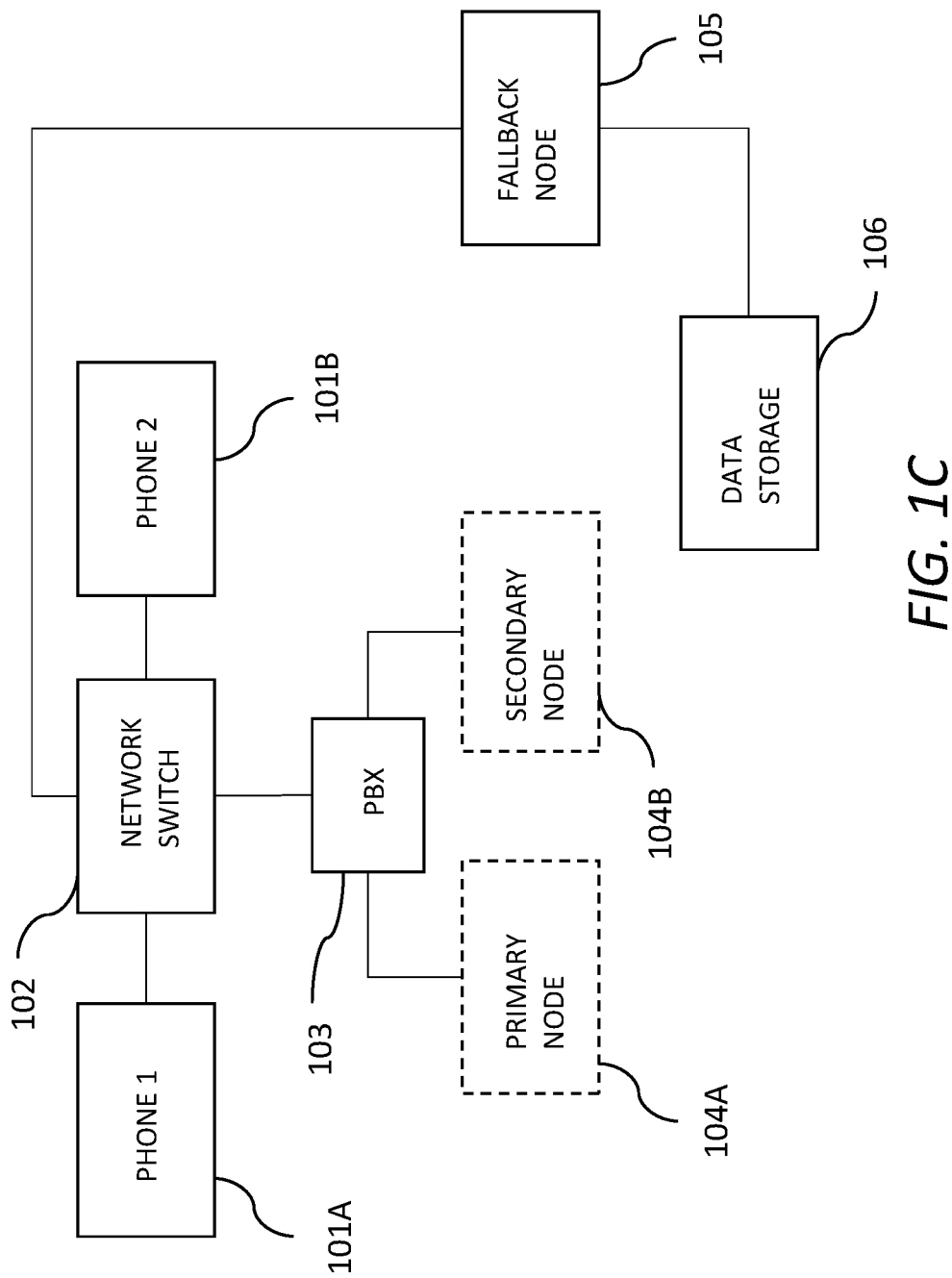
FIG. 1C shows exemplary configurations of network service during outages of a primary and secondary nodes.

With reference to FIG. 1C, shown is an exemplary system configuration 100C in which the primary node 104A and the secondary node 104B are both in failure conditions. In this situation, network packets are diverted to the fallback node 105. Capturing packets are continuously performed through the fallback node 105. The captured packets may be analyzed to determine the recording application format and to determine which packets are recording service related. The packets may be rescued by diverting or sending the captured packets to the storage unit 106. During audio recordings, the primary or secondary node produces recorded files with metadata that include speaker identification, transcribed audio, etc. Post processing of the captured and saved packet data enables reconstruction of the metadata eliminating the effects of the node outage of the primary and secondary nodes by recreating recorded file output.

Figure 2A:
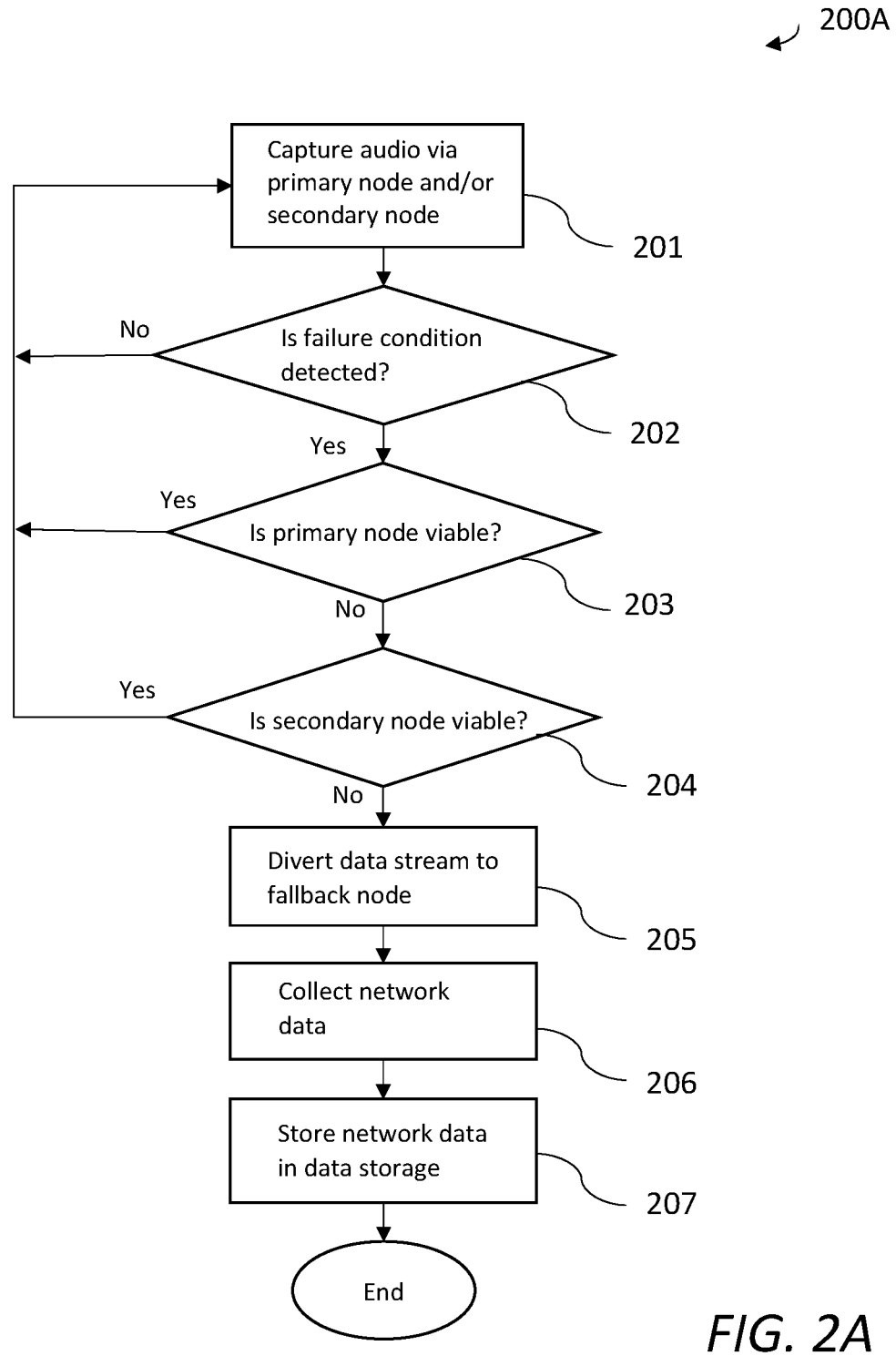
FIGS. 2A and 2B show workflow diagrams illustrating processes to provide network resiliency for audio capturing.
Figure 2B:
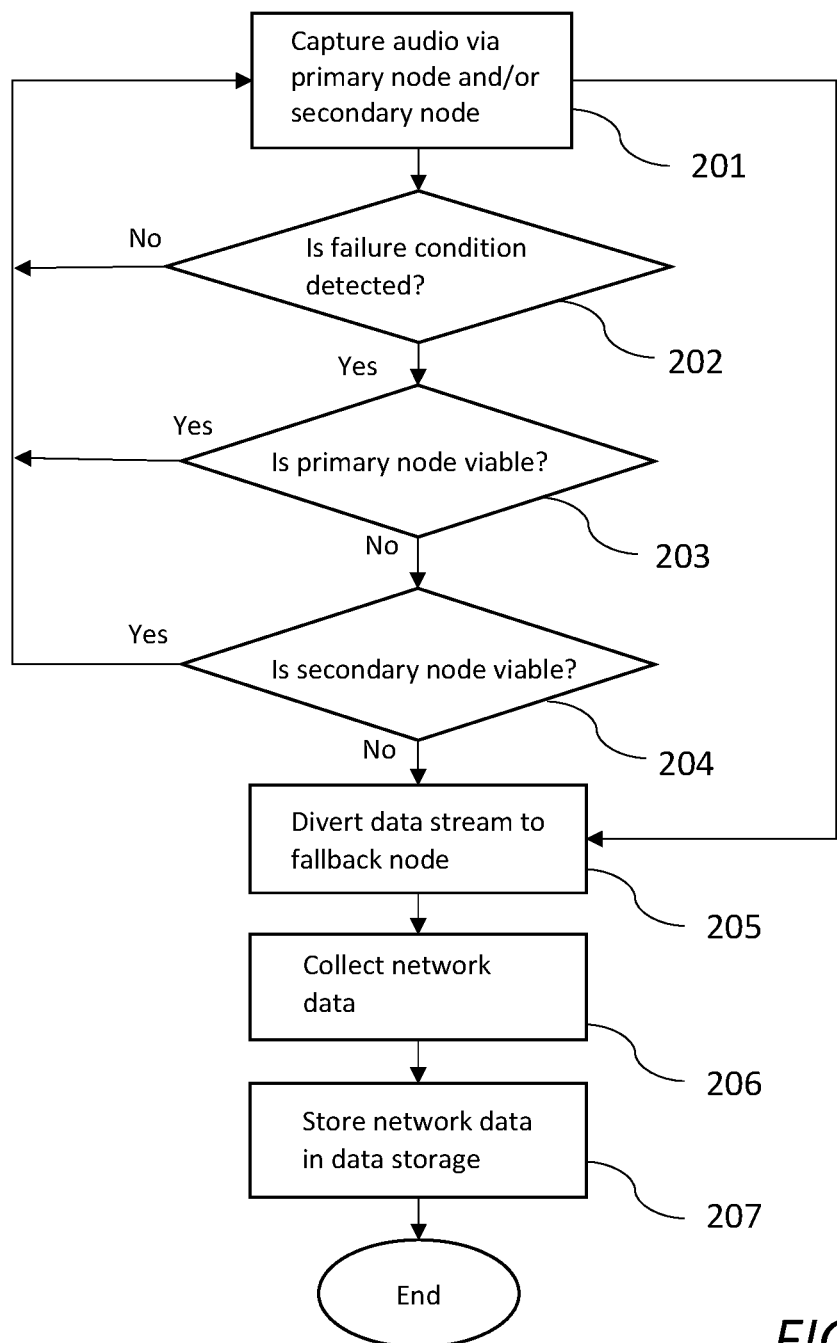

With reference to FIGS. 2A and 2B, shown are embodiments of methods of the disclosed invention to provide network resiliency for audio capturing when the audio capturing services experience a failure on one or more active nodes. In the packet buffering processes, the packets are mirrored by the network switch, for example, via port mirroring, and captured by a failover system. The network failover system determines which packets are recording service related and determines formats of the audio data in the packets. The packets, which are related to recording service, are processed as standard file output to be listened to or managed normally by any user, and are retained by using a temporary storage facility. The temporary storage facility may be standard to the L3 operation. The storage capability may be built into the network failover system, and the storage facility may be a hard disk drive. The network failover system may be referred to as a fallback collector.

FIG. 2A shows a workflow diagram for an embodiment of a method to provide network resiliency for audio capturing. Referring to FIG. 2A, the method 200A to provide network resiliency for audio capturing may begin with audio capturing process through one or more normal active nodes, block 201. The normal active nodes may include a primary node for main audio recording service and a secondary node for redundant audio recording service. When a failure condition of the active nodes is detected, block 202, the condition of the primary node is examined to check if the primary node is viable, block 203. If the primary node is viable or active, the audio capturing process is continued through the primary node and/or the secondary node, block 201. However, if the primary node is not viable or is not active, the condition of the secondary node is examined to check if the secondary node is viable, block 204. If the secondary node is viable or active, the audio capturing process is continued through the secondary node, block 201. If the secondary node is not viable or is not active, the network packets, which include audios to be captured, are diverted to a fallback node 205. The network packets and consequently network data transmitted through the fallback node are collected, block 206. The network data are stored in one or more data storage, block 207, for further analysis of the network data. The stored data keep the active recording session resilient even during outages of the primary and secondary nodes. Standard data recovery tools may be used to reconstruct the call metadata from the stored data. When the network packets are sent to the fallback node, the network failover system may determine which packets are audio related packets, determine formats of audio data, and instruct to collect network data and transmit the collected network data to the data storage.

FIG. 2B shows a workflow diagram for another embodiment of a method 200B to provide network resiliency for audio capturing. The steps shown in FIG. 2B are the same as the processes shown in FIG. 2A except that even when the primary node and/or the secondary node are viable, network data packets are sent to the fallback node, block 205, to continuously collect the network packets and to store the network packets in the one or more data storage. The sending network packet to the fallback node may begin when the audio capturing via primary and secondary nodes begins.

Figure 3:
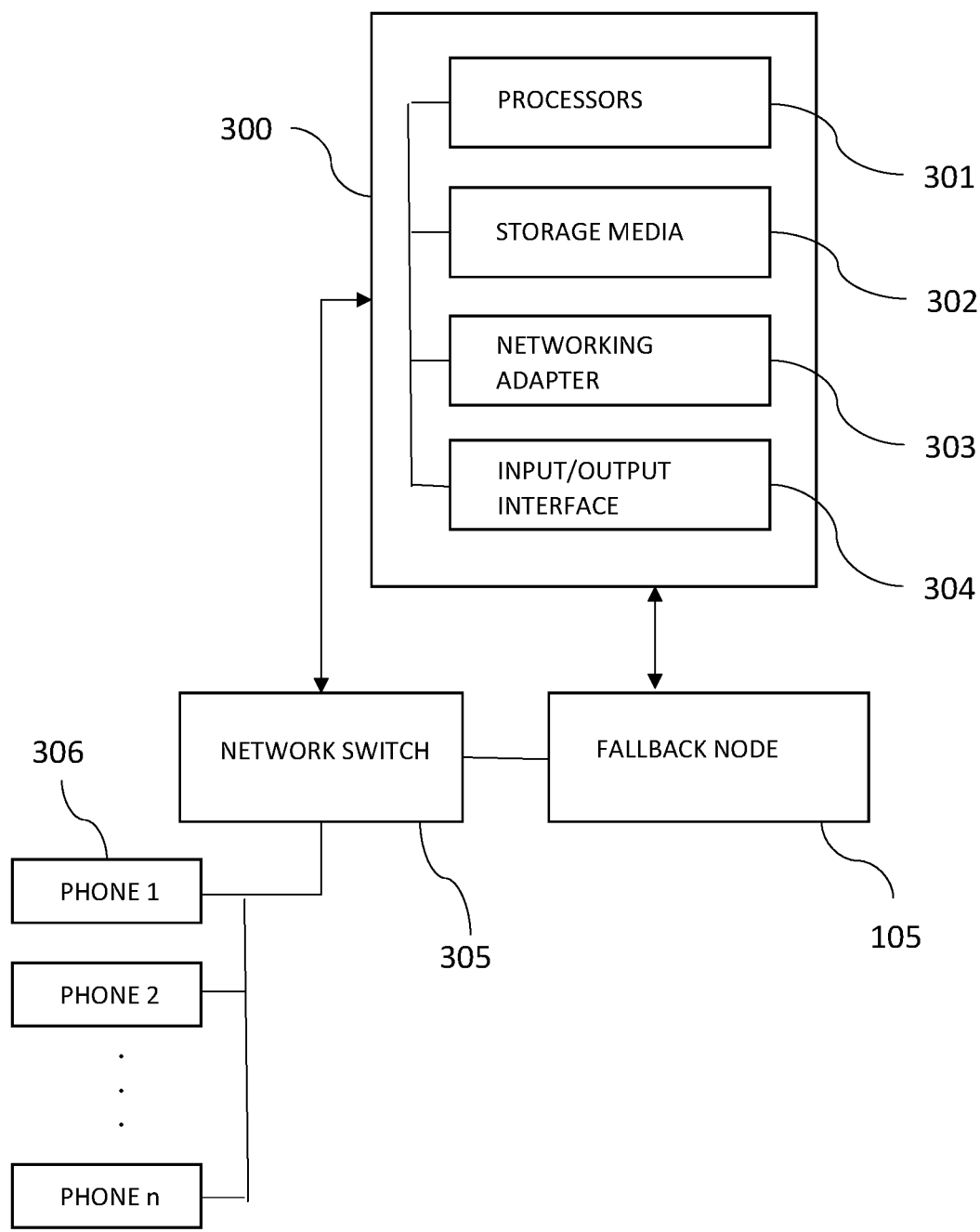
FIG. 3 shows a diagram illustrating a network failover system of the disclosed invention.

With reference to FIG. 3, shown is a diagram of a network failover system constructed as an embodiment of the disclosed invention. The network failover system 300 communicates with a network switch 305, as described referring to FIG. 1A. Network traffic between phones 306 is transmitted through the network switch 305. The network switch 305 may include port mirroring capability. The network switch 305 may be configured to mirror all network packets between the phones 306 and to send the collected network packets to the fallback node 105 through the network failover system 300. The network failover system 300 utilizes L3 network, and the fallback node 105 may be established in the L3 network. The network failover system 300 may divert network packets to the fallback node when failure of the primary node 104A and/or secondary node 104B (shown in FIG. 1A) is detected. Alternatively, the network failover system 300 may continuously send network packets to the fallback node regardless of the conditions of the primary and secondary nodes.

The network failover system 300 includes one or more storage media 302 that may include memories and/or hard disk drives. The storage media 302 stores software or computer programs including executable instructions. The network failover system 300 includes at least one processor 301 that executes the instruction stored in the storage media 302 to determine audio related packets among the network packets, to perform operations to transmit network packets to fallback node 105, to collect network data and transmit the collected network data to the data storage, and to perform necessary operations to provide resiliency in the network, if failure conditions of the primary node 104A or the secondary node 104B are detected. Specifically, the operations include receiving network packets from the network switch that mirrors the network packets sent to or received from the phones, monitoring a primary node that captures audio data in the network packets, sending the network packets to a fallback node during an outage of the primary node, examining the network packets to determine which packets are audio-related packets, collecting audio-related packets, and storing the collected audio-related packets in a data storage. The fallback node is in the Layer 3 (L3) network.

The network failover system 300 may monitor network traffic in real-time through the network switch 305, and may detect any failure condition of the primary node and the secondary node. The network failover system 300 may further include networking adapter 303 to communicate with the network switch 305 and fallback node 105, and to direct network packets to the fallback node 105. The communication of the network failover system 300 with the network switch 305 and the fallback node 105 may be through wired or wireless connections. The network failover system 300 may include one or more input/output interface 304 to communicate with the other external devices or systems or to interact with users.

Figure 4:
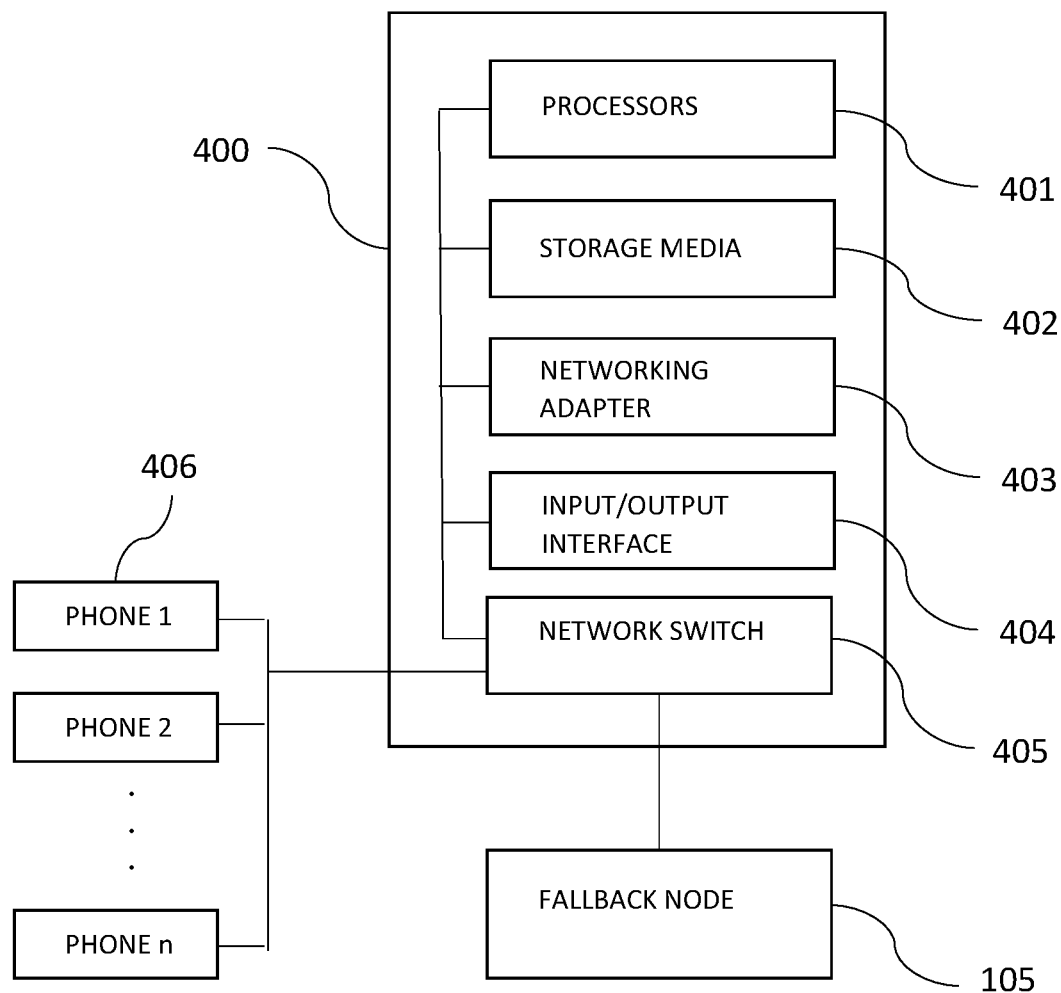
FIG. 4 shows a diagram illustrating a network resilient system of the disclosed invention.

With reference to FIG. 4, shown is a diagram of a network resilient system constructed as an embodiment of the disclosed invention. The network resilient system 400 includes one or more storage media 402 that may include memories and/or hard disk drives. The storage media 402 stores software or computer programs including executable instructions. The network resilient system 400 includes at least one processor 401 that executes the instruction stored in the storage media 402 to determine audio related packets among the network packets, to perform operations to capture network packets and send the network packet to fallback node 105, to collect network data and transmit the collected network data to the data storage, and to perform necessary operations to provide resiliency in the network, if failure conditions of the primary node 104A or the secondary node 104B are detected. Specifically, the operations of the network resilient system include receiving network packets from the network switch that mirrors the network packets sent to or received from the phones, monitoring a primary node that captures audio data in the network packets, sending the network packets to a fallback node during an outage of the primary node, examining the network packets to determine which packets are audio-related packets, collecting audio-related packets, and storing the collected audio-related packets in a data storage. The fallback node is in the Layer 3 (L3) network.

The network resilient system 400 may further include networking adapter 403 to be coupled to the fallback node 105 and to direct network packets to the fallback node 105. The network resilient system 400 may include one or more input/output interface 404 to communicate with the other external devices or systems or to interact with users. The network resilient system 400 includes a network switch 405 with port mirroring capability. The network switch is coupled to the network for audio capturing. Network traffic between phones 406 is transmitted through the network switch 405. The functionalities of the network switch 400 includes the functionalities of the network switch 102 described above.

The terms and descriptions used herein are set forth by way of illustration only and are not meant as limitations. Those skilled in the art will recognize that many variations are possible within the spirit and scope of the invention and the embodiments described herein.

What is claimed is:

1. A method for providing resiliency in a network for audio capturing, comprising:
   capturing audio data in network packets via a primary node connected to the network through a private branch exchange (PBX);
   monitoring the primary node;
   sending the network packet to a fallback node, wherein the fallback node is in a Layer 3 (L3) network;
   examining the network packets to determine which packets are audio-related packets;
   collecting audio-related packets;
   storing the collected audio-related packets in a data storage; and
   capturing the audio data in the network packets via a secondary node during an outage of the primary node, wherein the second node is connected to the network through the PBX.

2. The method of claim 1 further comprising:
   monitoring the secondary node; and
   sending the network packets to the fallback node during an outage of the secondary node.

3. The method of claim 1 further comprising mirroring the network packets via a network switch.

4. The method of claim 1 further comprising determining formats of the audio-related packets.

5. The method of claim 1 further comprising sending the network packets to a fallback node while the primary node is active.

6. The method of claim 1 further comprising storing the captured audio data via the primary node in the data storage.

7. The method of claim 1 wherein the audio data include metadata that include speaker identifications and audio transcription.

8. A network failover system to provide resiliency in a network for audio capturing, the network failover system coupled to a Layer 3 (L3) network and communicating with a network switch through which network packets are transmitted, comprising:
   at least one non-transitory storage medium to store executable instructions; and
   at least one processor to execute the executable instructions that cause the at least one processor to perform operations to provide the resiliency in the network for audio capturing, the operations comprising:
      receiving network packets from the network switch, wherein the network packets are mirrored via the network switch;
      monitoring a primary node that captures audio data in the network packets, wherein the primary node is connected to the network switch through a private branch exchange (PBX);

sending the network packet to a fallback node, wherein the fallback node is in a Layer 3 (L3) network;
examining the network packets to determine which packets are audio-related packets;
collecting audio-related packets;
storing the collected audio-related packets in a data storage; and
capturing the audio data in the network packets via a secondary node during an outage of the primary node, wherein the second node is connected to the network switch through the PBX.

9. The network failover system of claim 8 wherein the operations further comprise:
monitoring the secondary node; and
sending the network packets to the fallback node during an outage of the secondary node.

10. The network failover system of claim 8 wherein the operations further comprise determining formats of the audio-related packets.

11. The network failover system of claim 8 wherein the operations further comprise sending the network packets to a fallback node while the primary node is active.

12. The network failover system of claim 8 wherein the audio data include metadata that include speaker identifications and audio transcription.

13. A network resilient system to provide resiliency in a network for audio capturing, the network resilient system coupled to a Layer 3 (L3) network, comprising:
a network switch having port mirroring capability, wherein the network switch is coupled to the network for audio capturing;
at least one non-transitory storage medium to store executable instructions; and
at least one processor to execute the executable instructions that cause the at least one processor to perform operations to provide the resiliency in the network for audio capturing, the operations comprising:
receiving network packets from the network switch, wherein the network packets are mirrored via the network switch;
monitoring a primary node that captures audio data in the network packets wherein the primary node is connected to the network switch through a private branch exchange (PBX);
sending the network packet to a fallback node, wherein the fallback node is in the Layer 3 (L3) network;
examining the network packets to determine which packets are audio-related packets;
collecting audio-related packets;
storing the collected audio-related packets in a data storage; and
capturing the audio data in the network packets via a secondary node during the outage of the primary node, wherein the second node is connected to the network switch through the PBX.

14. The network resilient system of claim 13 wherein the operations further comprise:
monitoring the secondary node; and
sending the network packets to the fallback node during an outage of the secondary node.

15. The network resilient system of claim 13 wherein the operations further comprise determining formats of the audio-related packets.

16. The network resilient system of claim 13 wherein the operations further comprise sending the network packets to a fallback node while the primary node is active.

17. The network resilient system of claim 13 wherein the audio data include metadata that include speaker identifications and audio transcription.

* * * * *